US012621288B2

(12) United States Patent
Vijayaragavan et al.

(10) Patent No.: US 12,621,288 B2
(45) Date of Patent: May 5, 2026

(54) AGENTLESS PASSWORD ROTATION FOR BAREMETAL SERVERS

(71) Applicant: Rakuten Symphony, Inc., Tokyo (JP)

(72) Inventors: Pragash Vijayaragavan, San Jose, CA (US); Sree Nandan Atur, Newark, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/006,094

(22) PCT Filed: Nov. 17, 2022

(86) PCT No.: PCT/US2022/050253
§ 371 (c)(1),
(2) Date: Jan. 19, 2023

(87) PCT Pub. No.: WO2024/107193
PCT Pub. Date: May 23, 2024

(65) Prior Publication Data
US 2025/0274446 A1     Aug. 28, 2025

(51) Int. Cl.
*H04L 9/40* (2022.01)
(52) U.S. Cl.
CPC .................................. *H04L 63/083* (2013.01)
(58) Field of Classification Search
CPC ......................... H04L 63/083; H04L 63/0846
USPC .......................................................... 726/6
See application file for complete search history.

(56) References Cited

U.S. PATENT DOCUMENTS

| | | | |
|---|---|---|---|
| 9,699,173 B1 * | 7/2017 | Roth | G06F 21/45 |
| 10,812,530 B2 | 10/2020 | Ylonen | |
| 10,931,701 B2 | 2/2021 | Hoorvitch | |
| 11,093,437 B1 | 8/2021 | Pfiester | |
| 11,328,059 B2 * | 5/2022 | Rudnik | G06F 21/567 |
| 11,652,828 B1 | 5/2023 | Fricano | |
| 12,021,888 B1 | 6/2024 | Reed | |
| 12,355,787 B1 | 7/2025 | Reed | |
| 12,401,669 B1 | 8/2025 | Varakantam | |
| 12,425,428 B1 | 9/2025 | Sobrier | |

(Continued)

FOREIGN PATENT DOCUMENTS

| | | |
|---|---|---|
| CA | 2797451 C | 1/2018 |
| KR | 101627078 B1 | 6/2016 |
| WO | 2016179348 | 11/2016 |

OTHER PUBLICATIONS

Dominance as a New Trusted Computing Primitive for the Internet of Things, Xu et al, May 2019 (Year: 2019).*

(Continued)

*Primary Examiner* — Jahangir Kabir
(74) *Attorney, Agent, or Firm* — David R. Stevens; Stevens Law Group

(57) ABSTRACT
An orchestrator manages password rotation bare metal servers that lack an agent for performing password rotation. A user configures parameters for performing password rotation such as the frequency (e.g., cron command) and password rules for a bare metal server. Parameters may be associated with a theme that can be applied to one or multiple bare metal servers. When indicated by the frequency, the orchestrator runs a workflow with respect to one or more bare metal servers in order to change the passwords and update a vault store recording the passwords.

20 Claims, 9 Drawing Sheets

(56)  References Cited

U.S. PATENT DOCUMENTS

| | | | |
|---|---|---|---|
| 2005/0210267 A1* | 9/2005 | Sugano | H04W 12/069 |
| | | | 713/186 |
| 2011/0137809 A1 | 6/2011 | Klapheke | |
| 2011/0239126 A1 | 9/2011 | Erickson, Jr. | |
| 2015/0222604 A1 | 8/2015 | Ylonen | |
| 2016/0094577 A1 | 3/2016 | Shih et al. | |
| 2016/0164892 A1 | 6/2016 | Satish | |
| 2016/0330206 A1 | 11/2016 | Xu | |
| 2017/0011214 A1* | 1/2017 | Cavanagh | H04L 63/0846 |
| 2017/0034192 A1 | 2/2017 | Schulman | |
| 2017/0048260 A1 | 2/2017 | Peddemors | |
| 2017/0163677 A1 | 6/2017 | Gordon | |
| 2018/0131579 A1* | 5/2018 | Jacobs | H04L 41/022 |
| 2018/0351940 A1* | 12/2018 | Dennis | H04L 67/1095 |
| 2020/0204463 A1 | 6/2020 | Guan et al. | |
| 2020/0213334 A1 | 7/2020 | Kutner | |
| 2021/0021625 A1 | 1/2021 | Hoorvitch | |
| 2021/0056200 A1 | 2/2021 | Rudnik | |
| 2021/0152555 A1 | 5/2021 | Djosic | |
| 2021/0357939 A1 | 11/2021 | Davis | |
| 2021/0359897 A1* | 11/2021 | Shaked | H04L 12/281 |
| 2021/0406079 A1 | 12/2021 | Atur | |
| 2022/0104017 A1 | 3/2022 | Konda et al. | |
| 2022/0141209 A1 | 5/2022 | Zeck | |
| 2022/0156229 A1 | 5/2022 | Zhou | |
| 2022/0360600 A1 | 11/2022 | Reed et al. | |
| 2023/0308466 A1 | 9/2023 | Pagan | |
| 2024/0106846 A1 | 3/2024 | Kapoor | |
| 2024/0111856 A1* | 4/2024 | Zaidi | G06F 21/46 |
| 2025/0225253 A1 | 7/2025 | Godefroid | |
| 2025/0274446 A1 | 8/2025 | Vijayaragavan | |
| 2025/0274462 A1 | 8/2025 | Atur | |

OTHER PUBLICATIONS

HashiCorp Vault, https://www.vaultproject.io/, webpage, Jan. 18, 2023.

* cited by examiner

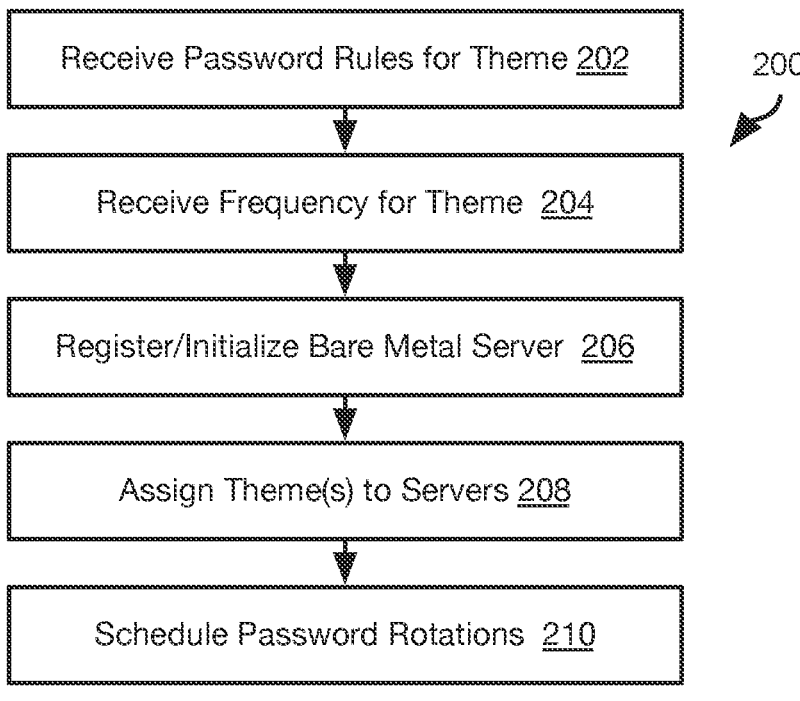

```
┌─────────────────────────────────────────┐
│   Receive Password Rules for Theme 202   │
└─────────────────────────────────────────┘
                     │
                     ▼
┌─────────────────────────────────────────┐
│    Receive Frequency for Theme  204      │
└─────────────────────────────────────────┘
                     │
                     ▼
┌─────────────────────────────────────────┐
│  Register/Initialize Bare Metal Server 206│
└─────────────────────────────────────────┘
                     │
                     ▼
┌─────────────────────────────────────────┐
│     Assign Theme(s) to Servers 208       │
└─────────────────────────────────────────┘
                     │
                     ▼
┌─────────────────────────────────────────┐
│    Schedule Password Rotations  210      │
└─────────────────────────────────────────┘
```

```
              ╱─────────────────────╲
             ╱    Rotation Due? 302   ╲
             ╲                        ╱
              ╲─────────────────────╱
                        │
                        ▼
┌─────────────────────────────────────────┐
│     Generate Passwords Per Rules 304     │
└─────────────────────────────────────────┘
                        │
                        ▼
┌─────────────────────────────────────────┐
│    Store Passwords in Vault Store 306    │
└─────────────────────────────────────────┘
                        │
                        ▼
┌─────────────────────────────────────────┐
│          Identify Servers 308            │
└─────────────────────────────────────────┘
                        │
                        ▼
┌─────────────────────────────────────────┐
│  Invoke Password Rotation Workflow For   │
│        Identified Servers 310            │
└─────────────────────────────────────────┘
```

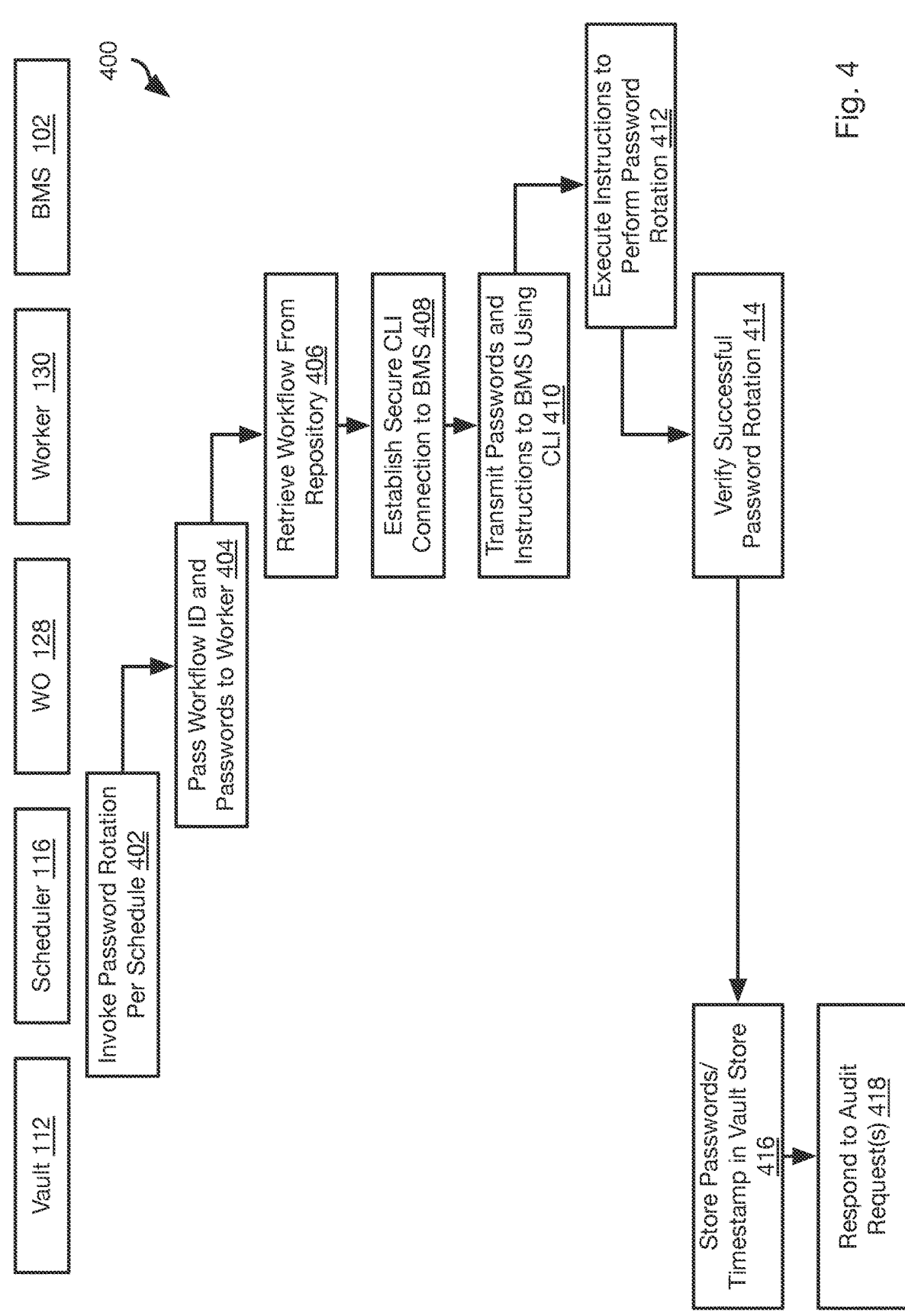

Vault 112

Scheduler 116

WO 128

Worker 130

BMS 102

400

Invoke Password Rotation Per Schedule 402

Pass Workflow ID and Passwords to Worker 404

Retrieve Workflow From Repository 406

Establish Secure CLI Connection to BMS 408

Transmit Passwords and Instructions to BMS Using CLI 410

Execute Instructions to Perform Password Rotation 412

Verify Successful Password Rotation 414

Store Passwords/ Timestamp in Vault Store 416

Respond to Audit Request(s) 418

Fig. 4

AGENTLESS PASSWORD ROTATION FOR BAREMETAL SERVERS

FIELD OF THE INVENTION

This invention relates to implementing password rotation on servers without the use of an agent executing on the servers.

BACKGROUND OF THE INVENTION

The modern data center or other computing facility is enormously complex and may be distributed over a wide geographic area. Performing administrative tasks manually is simply not practical. One such task is providing passwords used by servers when accessing services in the same facility or a third-party provider. The HashiCorp Vault is one tool that is used to provide automated management of passwords. This tool uses a vault agent executing on each server that interacts with a management server. Although the use of a vault agent is suitable for some applications, it requires prior installation and consumes computing resources that may be scarce in some applications.

It would be an advancement in the art to perform automated management of passwords in complex computing facilities.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2 is a process flow diagram of a method for setting up agentless password rotation in accordance with an embodiment of the present invention;

FIG. 3 is a process flow diagram of a method for performing password rotation in accordance with an embodiment of the present invention;

FIG. 4 is a process flow diagram of a method for performing password rotation using a command line interface on an operating system of a server in accordance with an embodiment of the present invention;

DETAILED DESCRIPTION

Figure 1:
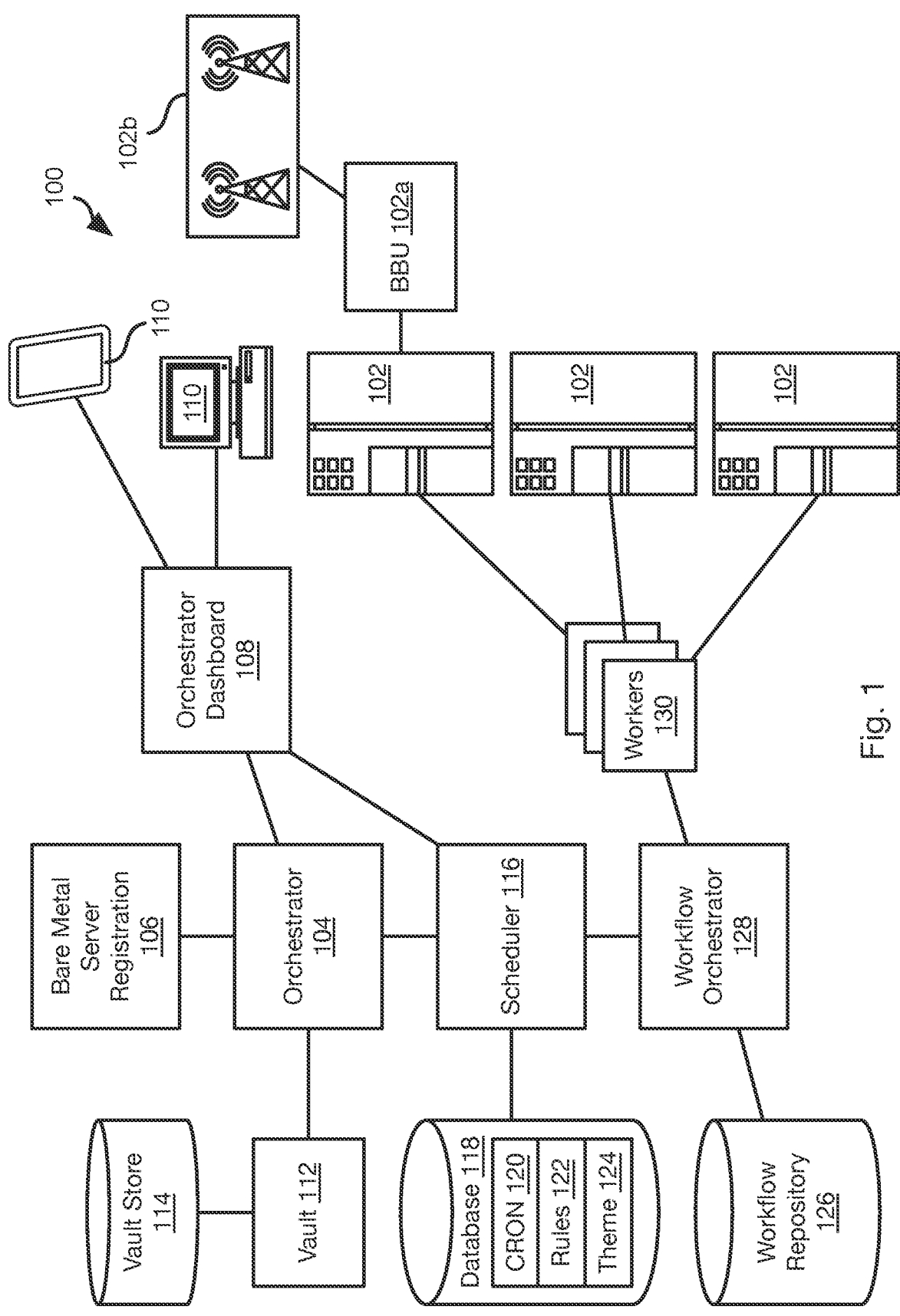
FIG. 1 is a schematic block diagram of a network environment in which agentless password rotation may be implemented in accordance with an embodiment of the present invention.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections.

The network environment 100 includes a plurality of bare metal servers 102. Each of the bare metal servers 102 may include one or more computing devices, such as a computing device having some or all of the attributes of the computing device 1200 of FIG. 12. As used herein "bare metal" refers to a server computer in an uninitiated state, e.g., having no operating system, kernel, or other software installed thereon other than firmware stored in non-volatile RAM on the device. A bare metal server 102 therefore lacks any agent for coordinating the performance of management tasks. The system and methods described herein enable password rotation to be performed with respect to a bare metal server 102. However, other servers of any type may also benefit from the systems and methods disclosed herein. Likewise, a cluster of servers, such as a cluster of servers coupled to a common control plane, may be processed in the same manner as a single server as described herein.

As used herein "password rotation" refers to the scheduled changing of passwords to enhance security. As used herein, "passwords" may be understood as including one or more passwords, one or more certificates, one or more tokens, one or more secrets, one or more encryption keys, a privacy enhanced mail certificate (PEM) file, or other data that may be used to perform authenticated and/or encrypted communication.

Passwords rotated according to the approach described herein may include operating system passwords for an operating system executing on a bare metal server 102 (root, user accounts, etc.), baseboard management controller (BMC) controller of the bare metal server 102, passwords for authenticating the bare metal server 102 as an administrator, tenant, or user account of the orchestrator 104, passwords for accessing database, or passwords for accessing other services or computing devices.

Passwords may be rotated in the form of a file or database containing multiple passwords. Password rotation on a bare metal server 102 may change the passwords for any application and may also change the consumers of the passwords, i.e., the identifiers of services, users, and/or computing devices that authenticate with the bare metal server 102 using the passwords or that authenticate the bare metal server 102 in response to presentation of the passwords.

In some embodiments, some or all of the bare metal servers 102 may function as edge servers in a telecommunication network. For example, some or all of the bare metal servers 102 may be coupled to baseband units (BBU) 102*a* that provide translation between radio frequency signals output and received by antennas 102*b* and digital data transmitted and received by the bare metal servers 102. For example, each BBU 102*a* may perform this translation according to a cellular wireless data protocol (e.g., 4G, 5G, etc.). Bare metal servers 102 that function as edge servers may have limited computational resources or may be heavily loaded such that executing an agent to perform password rotation and other tasks is not feasible. Likewise, where there are many bare metal servers 102, installing an agent for performing password rotation is a time-consuming task.

An orchestrator 104 executes on a computer system that is distinct from the bare metal servers 102 and is connected to the bare metal servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 104 cooperate with the bare metal servers 102 to create registrations 106. The registrations 106 may be created in a process by which a bare metal server 102 registers with the orchestrator 104 and is initialized and configured by the orchestrator 104. The registrations 106 may be created in a process in which a bare metal server 102 cooperates with the orchestrator 104 to obtain a gateway address to use for outbound communication and a source address assigned to the bare metal server 102 for use in inbound communication. The registrations 106 may also be created as part of a process by which an operating system is installed on the bare metal server 102. For example, the gateway address and source address may be provided and the operating system installed using the approach described in U.S. application Ser. No. 16/903,266, filed Jun. 16, 2020 and entitled AUTOMATED INITIALIZATION OF BARE METAL SERVERS, which is hereby incorporated herein by reference in its entirety.

The orchestrator 104 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 104 may also be in data communication with a vault 112 having a corresponding vault store 114. The vault 112 stores passwords in the vault 112 and controls access to the passwords. The passwords are some or all of (a) used by the bare metal servers 102 to authenticate users and other services accessing the bare metal servers 102 themselves, (b) used by the bare metal servers 102 to access services on other bare metal servers 102 or services executing on other servers of the network environment 100, and (c) services executing on third party servers external to the network environment 100 and accessed over the Internet or other network connection.

The orchestrator 104 may be in data communication with a scheduler 116. The bare metal servers 102 lack an agent for performing password rotation and otherwise being configured with passwords from the vault 112. The scheduler 116 may manage provision of passwords and password rotation on the bare metal servers 102. To that end, the scheduler 116 may create and/or access database 118 containing schedules that define a frequency with which password rotation is to occur with respect to one or more bare metal servers 102. For example, the schedule may be specified in the form of "cron" command 120 for UNIX-based operating systems. The cron command 120 may be created automatically or in response to a definition received by an administrator by way of the orchestrator dashboard 108. The scheduler 116 may further create and/or access password rules 122 that define requirements for passwords (e.g., permitted characters, minimum number of characters required, required character types, etc.) for each bare metal server 102.

In some embodiments, themes 124 may be defined and stored in the database 118. A theme 124 may be a grouping of parameters such as one or more scheduling definitions (e.g., cron command 120) and one or more password rules 122. The orchestrator 104 may therefore associate each bare metal server 102 with a theme to specify the scheduling definition and password rules 122 that apply to that bare metal server 102. The theme associated with a bare metal server 102 may correspond to the service executed by the bare metal server 102 and may be specified by an administrator through the orchestrator dashboard 108. For example, a bare metal server 102 may be assigned a theme based on type: far edge (e.g., connected directly to a BBU 102*a*), edge, or core. Each type may have a theme associated therewith corresponding to the amount of exposure and corresponding risk of each location. For example, a far edge server has more interaction with external threats and may therefore require more frequent password rotation than an edge or core server.

In some embodiments, the frequency of password rotation may be dynamic and responsive to operating conditions. For example, the orchestrator 104 may pull access logs from the bare metal servers 102. The frequency of password rotation for a bare metal server 102 or type of bare metal server 102 (e.g., far edge, edge, core) may be increased with increase in a number and/or frequency of unsuccessful login attempts detected for that bare metal server 102 or type of bare metal server 102.

When password rotation is due according to a cron command 120, the scheduler 116 may invoke execution of a workflow in order to perform password rotation with respect to one or more bare metal servers 102 referenced by the cron command 120. The passwords used in performing password rotation may be created according to the password rules 122 for the one or more bare metal servers 102. The passwords used during each rotation may be stored in the vault store 114.

Invoking the workflow may include referencing an identifier of a workflow stored in a workflow repository 126. The scheduler 116 may instruct a workflow orchestrator 128 to perform the workflow with respect to one or more bare metal servers 102. In response, the workflow orchestrator may select one or more workers 130 from a worker pool to implement the workflow. Each worker 130 may be a container executing on a computing device that is the same as or different from the computing device executing the scheduler 116. The workflow may include multiple function calls and, when executed, may include causing the one or more workers 130 to transmit data and instructions to the one or more bare metal servers 102 and verify receipt of the data and completion of the instructions by the one or more bare metal servers 102.

Inasmuch as the one or more bare metal servers 102 lack an agent for performing password rotation, the instructions may be in the form of operating system commands or calls to other application programming interfaces (API) provided by the operating system on the bare metal server 102. For example, rlogin, ssh, remote procedure calls (RCP), or other function calls may be used to transfer passwords to the one or more bare metal servers 102 and configure the one or more bear metal servers 102 to one or both of (a) use the passwords to access a service or to (b) authenticate and grant access to other computing devices that present the passwords when attempting to access a service provided by the one or more bare metal servers 102.

A user may also access the scheduler 116 by way of the orchestrator dashboard 108 in order to perform other tasks such as auditing scheduled password rotations: e.g., identifying servers that will have password rotations performed within a specified time period (e.g., the next quarter), editing scheduling data (e.g., cron commands), editing password rules 122, editing themes 124, or performing other management tasks.

FIG. 2 illustrates an example method 200 that may be executed by the scheduler 116. The method 200 may be executed in response to inputs received from a user computing device 110 by way of the orchestrator dashboard 108.

The method may include defining a theme that may be assigned to one or more a bare metal servers 102. For example, the method 200 may include receiving 202 one or more password rules for a theme and receiving 204 a password rotation frequency for a theme. The password rotation frequency may be specified as a period (number of days, weeks, months, quarters, years, etc.) that is then translated by the scheduler 116 into a cron command 120 or the password rotation frequency may be received in the form of a cron command or other syntax for specifying the scheduling of repeated tasks. The scheduler 116 may then store a theme 124 having the specified password rules and password rotation frequency in the database 118.

The method 200 may further include registering and/or initializing 206 one or more bare metal servers 102 and assigning 208 the theme to the one or more bare metal servers 102. In response to the assignment 208, the one or more bare metal servers 102 may then have password rotations scheduled 210 to be performed according to the assigned them. As an alternative, password rules may be specified and password rotation may be scheduled for one or more bare metal servers individually or as a group without the use of a theme 124.

FIG. 3 illustrates a method 300 may be executed by the scheduler 116 in response to determining 302 that password rotation is due for one or more bare metal servers 102 according to a cron command 120 or other specification of password rotation frequency. The method 300 may include generating 304 passwords according to the password rules 122 specified for the one or more bare metal servers, such as those specified in a theme 124 assigned to the one or more bare metal servers. Generating 304 the passwords may be performed by a software component generating random strings according to the password rules. This software component may be accessed by the scheduler 116. For example, the orchestrator 104 may implement the software component for generating the passwords according to the password rules. The passwords may be stored 306 in the vault store 114. In some implementations, steps 304 and 306 may be performed in advance of the time that password rotation is due according to the cron command. In others, steps 304 and 306 are performed after the cron command 120 indicates that password rotation is due. In some implementations, passwords are stored 306 in the vault store 114 only after the password rotation including the passwords has been successfully completed with respect to the one or more servers.

One or more bare metal servers 102 referenced by the cron command 120 may be identified 308 and the scheduler 116 may invoke 310 performance of a password rotation workflow with respect to the identified one or more bare metal servers 102. As noted above, step 310 may include instructing a worker 130 to implement a pre-defined workflow stored in a workflow repository 126. As also noted above, step 310 may include instructing a worker 130 from a pool to implement the workflow. Implementing the workflow may include transmitting instructions and data to the one or more bare metal servers. Implementing the workflow may include receiving acknowledgement of receipt of data, i.e., passwords, and resending data if acknowledgement is not received. Implementing the workflow may include transmitting instructions to the one or more bare metal servers 102 and resending the instructions or performing other remediating actions if verification of completion of the instructions is not received from the one or more bare metal servers 102. The workflow may further include the implementation of safeguards to protect passwords, such as encryption, establishing a secure connection to the one or more bare metal servers 102, and/or other approaches for preventing interception and access of password data.

FIG. 4 illustrates an example method 400 for implementing agentless password rotation with respect to a bare metal server 102 using only an operating system installed on the bare metal server 102. The method 400 may include the scheduler 116 invoking 402 password rotation in response to password rotation being due according to a previously-created schedule, e.g., cron command referencing the bare metal server 102. Invoking 402 password rotation may include requesting performance of password rotation from the workflow orchestrator 128. The scheduler 116 may, for example, obtain passwords according to the password rules and pass a request to the workflow orchestrator 128. The request may include, for example, the passwords, an identifier (e.g., source address) of the bare metal server 102, and/or an identifier of a password rotation workflow stored in the workflow repository 126. In some embodiments, generation of the passwords is part of the workflow such that the passwords are not passed to the workflow orchestrator 128.

In response to the request, the workflow orchestrator 128 may select a worker 130 and pass 404 some or all of the information from the request to the worker 130. The worker 130 may then retrieve 406 the identified workflow (e.g., executable code defining the workflow) from the workflow repository 126 (if not already present on the worker 130) and execute the workflow.

Executing the workflow may include establishing 408 a secure command line interface (CLI) interface to the bare metal server 102. For example, secure shell (SSH) protocol may be used to connect to a SSH daemon executing on the bare metal server 102. The SSH daemon is a common utility in most UNIX-based operating systems and therefore a dedicated agent of the orchestrator 104 is not required or used to perform password rotation. The worker 130 may then transmit 410 passwords and instructions to the bare metal server 102 through the CLI interface. The bare metal server 102 receives the data and executes 412 the instructions in order to perform password rotation. For example, step 410 may include transmitting a file (e.g., script or binary executable) to the bare metal server 102 that, when executed 412, causes the bare metal server 102 to configure the bare metal server 102 to one or both of (a) use the passwords to access a service or to (b) authenticate and grant access to other computing devices that present the passwords when attempting to access a service provided by the one or more bare metal servers 102. Configuring the bare metal server to perform (a) and/or (b) may include writing passwords (e.g., a file or database) to a specific file system location on the bare metal server 102 and/or modifying configuration files or environmental variables of the bare metal server 102.

The worker 130 may further verify 414 successful completion of password rotation. Verifying successful completion may include (a) receiving a message transmitted in response to executing instructions included in the file and/or (b) transmitting commands through the CLI interface to read the state of the bare metal server 102 in order to verify that the password rotation was completed (e.g., reading data from a directory location, environmental variable, or other data).

Following successful completion of password rotation (or at any point after the passwords are generated), the passwords may be stored 416 by the vault 112 in the vault store 114. The passwords may be stored in the vault with additional items of information such as a timestamp indicating when the passwords were rotated onto the bare metal server 102 and an identifier of the bare metal server 102.

At any time following password rotation, an administrator may audit the password rotations performed by the method 400 in order to verify that passwords are being rotated according to policies of the administrator. For example, the administrator may send audit requests from a user computing device 110 to the orchestrator dashboard 108. For example, the administrator may request a report of bare metal servers 102 that have not had passwords rotated in the last N months, where N is a predefined value. The orchestrator 104 may pass these audit requests to the vault 112. The vault 112 responds 418 to the audit request with information requested by the audit request, e.g., identifiers of all bare metal servers 102 with password rotation time stamps older than N months. Information returned by the vault 112 in response to the audit request may then then be passed by the orchestrator 104 to the user computing device 110 by way of the orchestrator dashboard 108.

Note that only the orchestrator 104 and scheduler 116 are described as accessing the vault 112 in the approach described herein. For example, the vault 112 may have one port and one route defined to the orchestrator 104 such that all traffic with the vault 112 is by way of the orchestrator 104. This reduces the number of entities that have authentication information (password, certificate, token, encryption key, etc.) for accessing the vault 112. In prior approaches, each server accessing a password vault can authenticate with the vault, which creates many opportunities for unauthorized access of authentication information. In prior approaches, each server using a vault establishes a network connection to the vault, which requires port allocation, routing, and other network configurations that create administrative burdens, delays, and security vulnerabilities.

Figure 5:
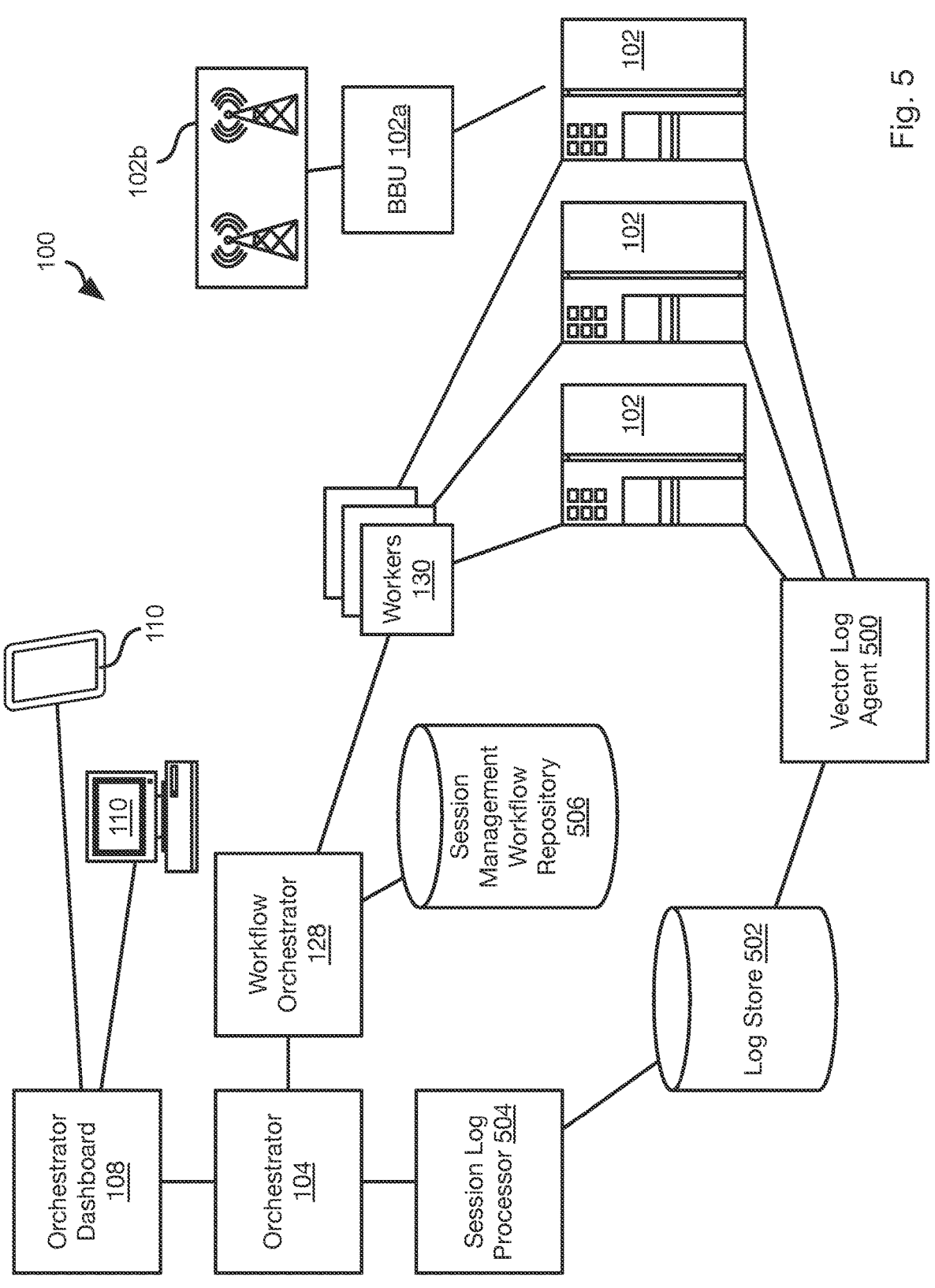
FIG. 5 is a schematic block diagram of a network environment in which agentless user session management may be implemented in accordance with an embodiment of the present invention.

Referring to FIG. 5, the network environment 100 may additionally or alternatively perform agentless user session management. For example, the bare metal servers 102 may have a network connection to a vector log agent 500. The vector log agent 500 may execute on the same computing device as the orchestrator 104 or other component of the network environment 100 other than one of the bare metal servers 102. One or multiple instances of the vector log agent 500 may also execute on the bare metal servers 102.

The vector log agent 500 extracts log data from the bare metal servers 102. For example, the vector log agent 500 may read log data from directory locations where the log data is stored, such as "/var/log/secure," "/var/log/messages," or other predefined directory locations. The vector log agent 500 may store log data extracted from the bare metal servers in a log store 502.

The vector log agent 500 may enrich the log data and store the enriched log data in the log store 502. For example, the vector log agent 500 may include a vector remap language (VRL) command interpreter and may process VRL statements with respect to the log data in order to enrich the log data. For example, the VRL statements may process the log data in order to extract session identifiers, process identifiers (PIDs), usernames, start and end times (e.g., of users sessions, processes, etc.), or other data.

A session log processor 504 may then retrieve the log data from the log store 502 and process the log data to generate user session records. The session log processor 504 may execute on the same computing device as the orchestrator 104 or may be connected to the orchestrator, log store 502, and/or vector log agent 500 by one or more network connections. The session log processor 504 may process the log data in real time (e.g., within 50 milliseconds, 1 second, or 10 seconds of writing to the log store 502). Alternatively, the log store 502 is omitted and data from the vector log agent 500 is streamed directly to the session log processor 504. A user session record may record data characterizing a user session, such as the user identifier (UID) of the user, a login time, a logout time, process identifiers of processes that are running or ran during the user session, identifiers (e.g., path) of executables executed during the user session, a source address of a computing device by which the user connected to the bare metal server, identifiers of files read or written during the user session, operating system commands executed during the user session, or any other data known in the art to be relevant to characterizing the behavior of a user, including the detection of suspicious or malicious activity.

The orchestrator 104 may receive and process the user session records. The orchestrator 104 may detect potentially suspicious or malicious activity, overloading of the bare metal servers 102, violation of policies, usage in excess of purchased computing resources, or other actions or patterns of activity that require action.

If an action is required in view of the processing of the user session records, herein after a "session management action," the orchestrator 104 may instruct the workflow orchestrator 128 to implement the session management action. In response, the workflow orchestrator retrieves a workflow corresponding to the session management action from a session management workflow repository 506, selects a worker 130, and instructs the worker 130 to implement the workflow with respect to one or more of the bare metal servers 102. As for other embodiments disclosed herein, the workflow may be implemented by the worker 130 without cooperation with a user session management agent executing on the one or more bare metal servers 102.

Figure 6:
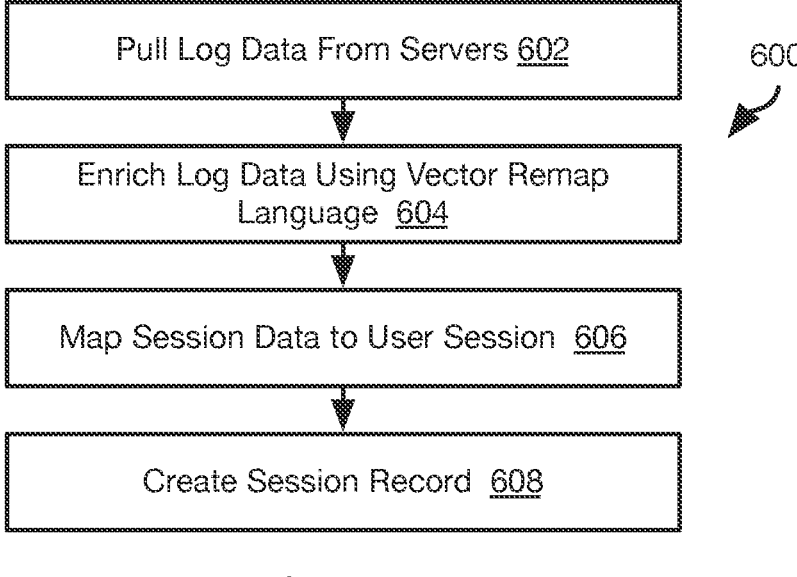
FIG. 6 is a process flow diagram of a method for extracting user session information in accordance with an embodiment of the present invention.

FIG. 6 illustrates a method 600 that may be implemented using the network environment 100. The method 600 is described with respect to a single bare metal server 102 with the understanding that multiple bare metal servers 102 may be processed in the same manner, particularly where a user session includes accessing services on multiple bare metal servers 102. The method 600 includes pulling 602 log data from the bare metal server 102. Pulling 602 the log data may be performed by the vector log agent 500, the orchestrator 104, session log processor 504, or some other entity. The log data may be read from one or more files at one or more directory locations on the bare metal server 102 known to store log data for the operating system, a service of the operating system, and application executing on the bare metal server 102, or other component executing on the bare metal server 102. Pulling 602 the log data may include transmitting a request to a service (e.g., daemon or other utility) executing on the bare metal server 102 and receiving a response to the request, the response including the log data.

The method 600 may include enriching 604 the log data. Enriching 604 the may be performed by the vector log agent 500, the orchestrator 104, session log processor 504, or some other entity. For example, enriching 604 the log data may include executing one or more VRL statements with respect to the log data. For example, enriching 604 the log data may include executing one or more VRL statements to extract some or all of session identifiers, process identifiers (PID), usernames, start times, and end times. The output of the enriching 604 may include a filtered version of the log data including an array of key-value pairs. For example, the keys of the key-value pairs may include a label indicating a type (session identifier, PID, username, start time, and end time) and the value of each key-value pairs may include the log data corresponding to that type.

The method 600 may further include mapping 606 the log data to a specific user session. Mapping 606 may be performed with respect to the enriched data. In some operating system, a user session is a specific type of process ("a user session process"). Mapping 606 log data to a user session may include identifying a PID of a user session process ("session PID"), obtaining the username associated with the session PID and identifying the PIDs of other processes spawned by the user session process ("spawned processes"). The log data referencing the session PID and spawned PIDs may then be identified within the log data.

The method 600 may include generating 608 a user session record for each user session, e.g., each PID of a user session process. The user session record may include the data obtained during enriching (session identifier, PID of user session process), username, start time, and end time) as well as other data mapped 606 to the user session, such as error messages, logs of network sessions and traffic, file system activity (reads, writes, etc.), or other data. A user session record may be created over time: steps 602-608 may be performed over time and data corresponding to the session PID may be added to the user session record for that session PID as the data is received.

Figure 7:
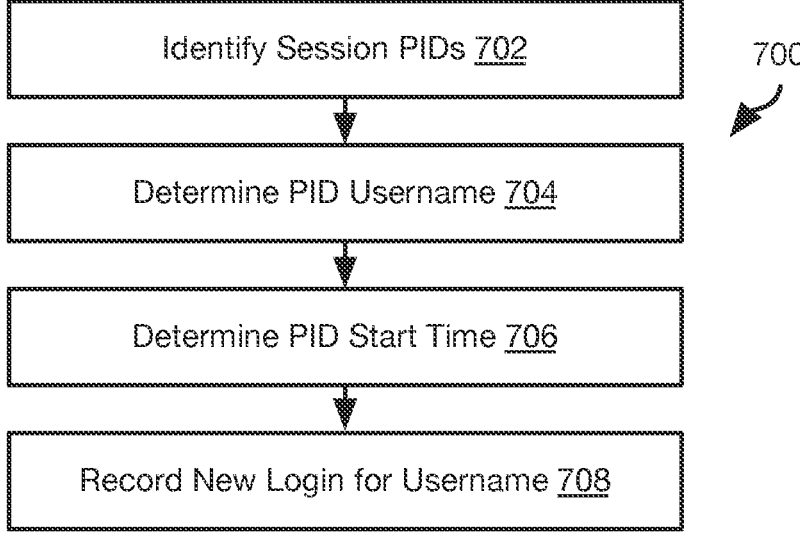
FIG. 7 is a process flow diagram of a method for extracting a new login from session information in accordance with an embodiment of the present invention.
Figure 8:
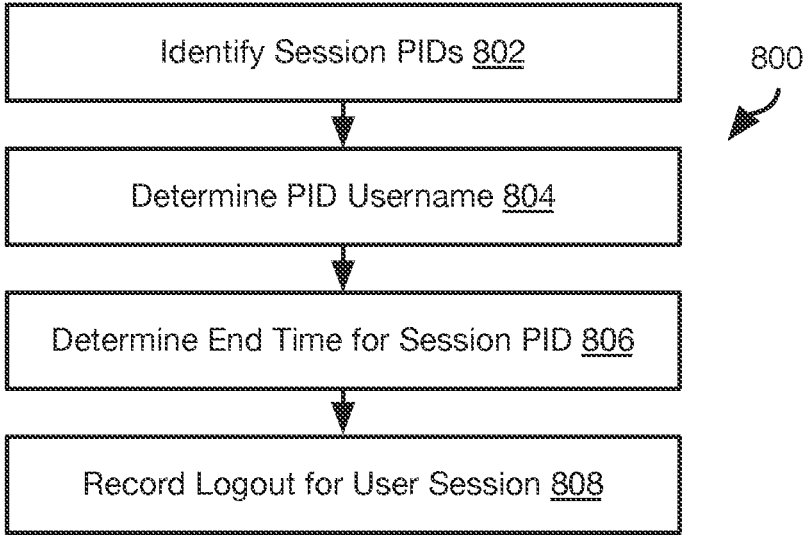
FIG. 8 is a process flow diagram of a method for extracting a logout from session information in accordance with an embodiment of the present invention.
Figure 9:
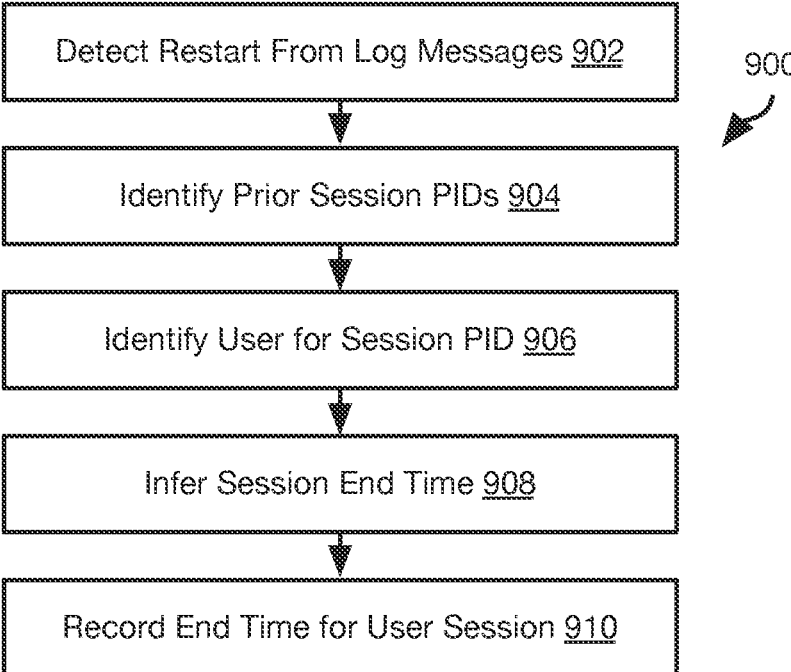
FIG. 9 is a process flow diagram of a method for recording session data in the event of a server restart in accordance with an embodiment of the present invention.

Referring to FIGS. 7 to 9, user session records may be processed in order to detect specific events. The methods of FIGS. 7 to 9 may be performed by the session log processor 504, orchestrator 104, or some other entity.

Referring specifically to FIG. 7, a method 700 for detecting logins may include analyzing the user session records to identify 702 the session PID of the user session record. The method 700 may further include analyzing the user session record to determine 704 the username of the owner of the session PID. The method 700 may include analyzing the user session record to determine 706 the start time of the user session process referenced by the session PID. The start time may be obtained from log data using VPR statements or may be obtained by some other approach. A new login may be recorded 708. The record of the new login may include such information as the username, start time and/or session PID.

FIG. 8 illustrates a method 800 for detecting logouts. The method 800 may include analyzing the user session records to identify 802 the session PID of the user session record. The method 800 may further include analyzing the user session record to determine 804 the username of the owner of the PID. The method 800 may include analyzing the user session record to determine 806 the end time of the user session process referenced by the session PID. The end time may be obtained from log data using VPR statements or may be obtained by some other approach. A logout may be recorded 808. The record of the logout may include such information as the username, end time and/or session PID.

FIG. 9 illustrates a method 900 for detecting ending of sessions due to a bare metal server 102 restarting. The method 900 includes detecting 902 restarting of the bare metal server. Detecting 902 restarting may include detecting messages in the log data indicating that the bare metal server 102 has been restarted. The method 900 may include identifying 906 a session PID of user session processes that were executing at the time the bare metal server 102 was shut down prior to being restarted. These session PIDs may be identified in various ways. For example, user session records for user session processes on the bare metal server that were created prior to shut down and which lack and end time may be identified. The session PIDs of these user session records may then be deemed to correspond to user session processes that were active at the time of shut down. In other implementations, a crash report, kernel crash dump, error message log, or other source of log data on the bare metal server 102 may be retrieved and evaluated to identify the session PIDs of user session processes that were active at the time of shut down.

The method 900 may include inferring 908 a session end time for each session PID identified at step 904. Inferring the session end time may be done in various ways. In a first example, the session end time is simply taken as the time the bare metal server 102 is restarted. In a second example, if a record indicating a cause of shut down exists (e.g., crash report, kernel crash dump, error message log, or record of intentional shut down), then the session end time is inferred to be a time of creation of the record or the last recorded time stamp of an entry in the record. In a third example, the session end time for each session PID identified is inferred to be a time stamp of the last data recorded in the user session record for the each session PID identified. The inferred session end time may then be recorded 910 in the user session record for each session PID identified at step 904.

Figure 10:
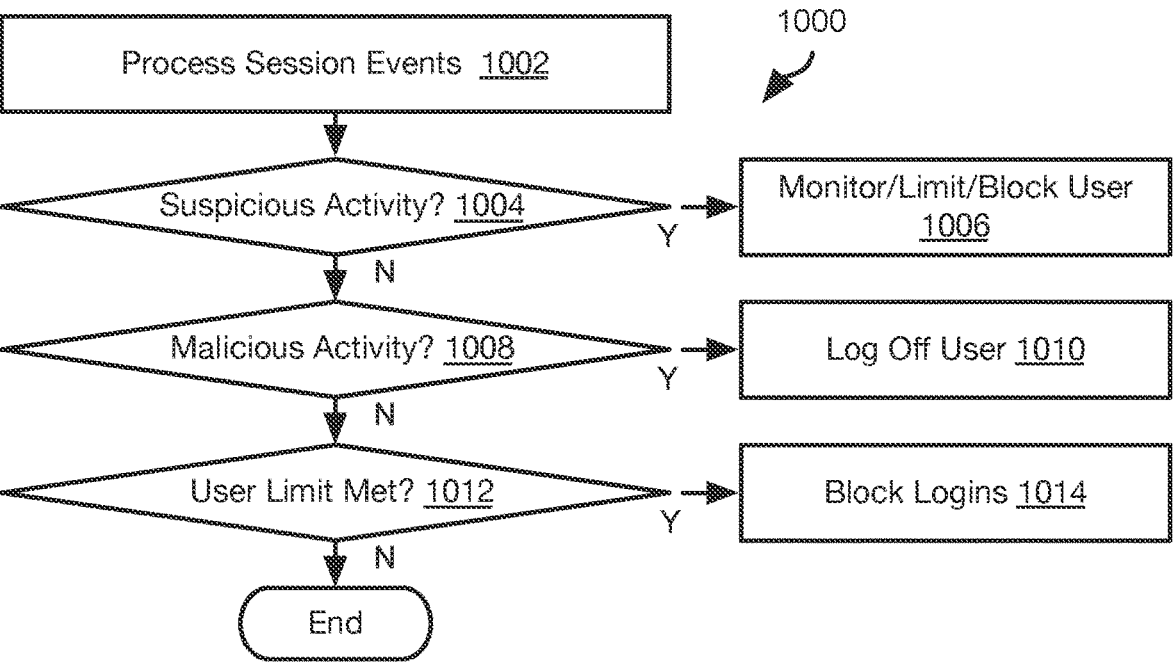
FIG. 10 is a process flow diagram of a method for performing user session management in accordance with an embodiment of the present invention.

FIG. 10 illustrates a method 1000 for processing session events, as used herein "session events" can refer to some or all of: a set of user session records for a single user or multiple users, a collection or statistical characterization of data for a plurality of users sessions of a single user or multiple users, such as any of the data described herein as being recorded in a user session record. For example, session events may include a collection or statistical characterization of session start times, session end times, error messages, logs of network sessions and traffic, file system activity (reads, writes, etc.), or other data. The method 1000 may be performed by the orchestrator 104, session log processor 504, or other component.

The method 1000 may include processing 1002 the session events. The processing 1002 may include some or all of:

Processing the session events according to a pattern matching algorithm or other anti-virus algorithm in order to identify suspicious activity.

Comparing a statistical characterizations of the session events to predefined thresholds to identify suspicious activity (e.g., evaluate whether a number of unsuccessful login attempts within a predefined time window exceeds a threshold).

Comparing a statistical characterizations of the session events to a policy (e.g., determine whether the number of active user sessions on a bare metal server 102 or a group of bare metal servers exceeds an allowed number for a tenant with which the usernames of the active user sessions are associated).

The listing above is exemplary only. Any algorithm, policy, or software tool known in the art for analyzing user behavior with respect to a computer system may be used to process the session events.

If the processing 1002 is found 1004 to indicate suspicious activity for session events performed by any users logged in under a username, then the method 1000 may include performing 1006 a remediating action with respect to the username, such as monitoring or limiting activities of users logged in using the username or blocking logins using the username.

If the processing 1002 is found 1008 to indicate malicious activity for session events performed by any users logged in under a username, then the method 1000 may include immediately logging off all sessions logged into the username and preventing further logins.

If the processing 1002 is found 1012 to indicate that the number of users logged into the bare metal server 102 or a group of bare metal servers 102 meets a limit, then the method 1000 may include blocking 1014 additional logins.

The evaluations of steps 1004, 1008, and 1012 are exemplary only. Any criteria set by an administrator may be evaluated with respect to the session events and, when the criteria is found to be met by the session events, a corresponding action may be performed as defined by the administrator. For example, the corresponding action may include sending an alert to an administrator.

Figure 11:
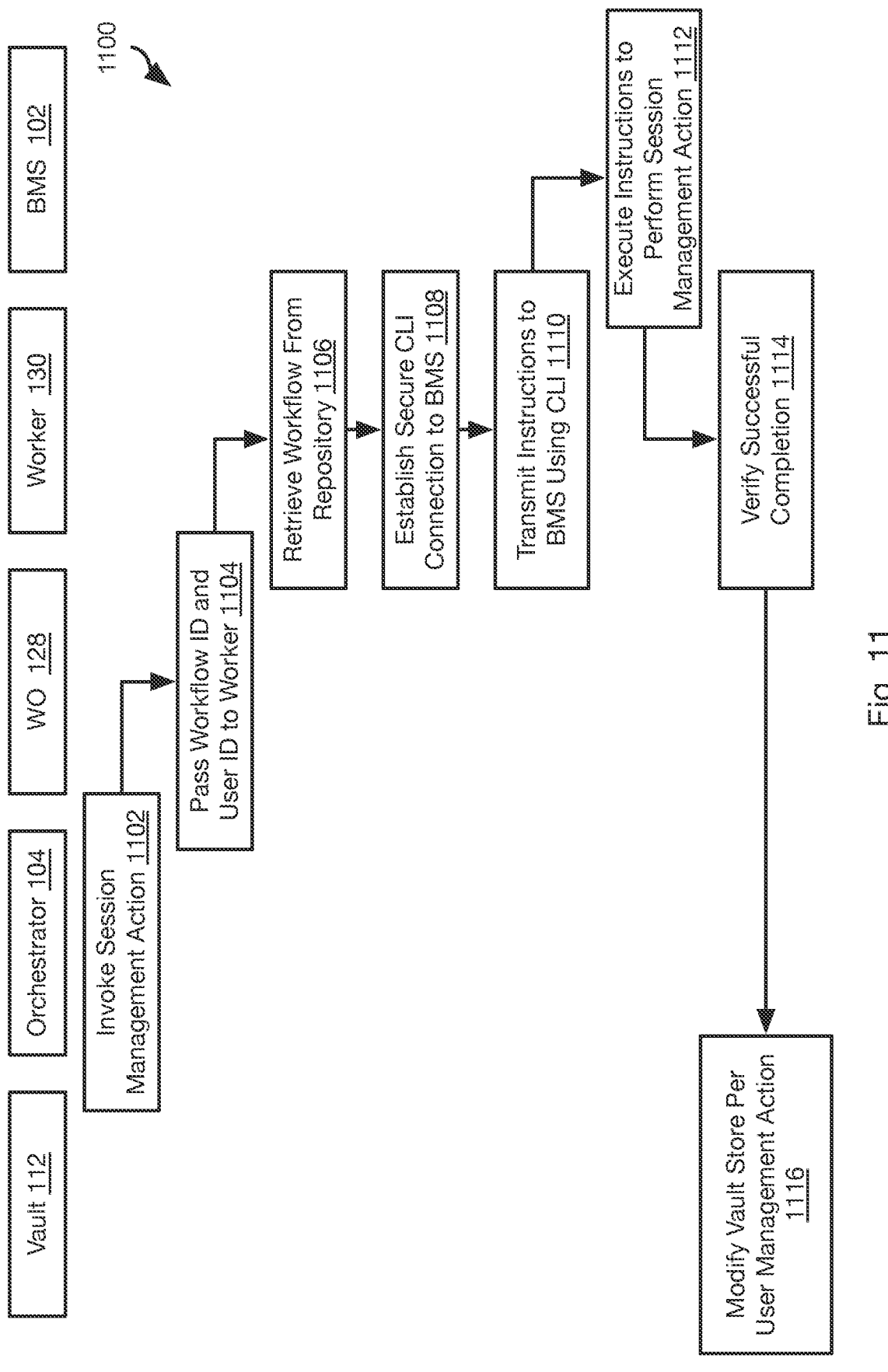
FIG. 11 is a process flow diagram of a method for implementing a session management action in accordance with an embodiment of the present invention.

FIG. 11 illustrates a method 1100 for performing a session management action. As used herein, "a session management action" refers to any action taken in response to processing of the session events, including those described above with respect to steps 1006 (monitor, limit, and/or block user), 1010 (log off user), and 1014 (block logins) or any other action conditioned on the session events satisfying a predefined criterion. The foregoing descriptions ascribes certain actions to certain components with the understanding that other components, or a single component, may perform these actions.

The orchestrator 104 invokes 1102 the session management action by making a request to the workflow orchestrator 128. The request may include the username with respect to which the session management action is performed and may include other information such as the session PID of an active session belonging to the username, an identifier of the bare metal server 102 on which the session management action is to be performed, an identifier of the session management action (e.g., an identifier of a workflow in the session management workflow repository 506), and possibly other information. A request may also reference multiple usernames and/or multiple bare metal servers 102 with respect to which the session management action is to be performed. For example, a request may invoke a workflow with respect to all bare metal servers 102 or all bare metal servers 102 of a certain type (e.g., those available for login by users or executing a particular application or service). Likewise, a request may invoke a workflow with respect to all usernames, usernames associated with a particular tenant, a group of usernames for which suspicious or malicious activity was detected, or usernames treated as a group for any other reason.

The workflow orchestrator 128 may then select a worker 130 and pass 1104 some or all of the information from the request to the worker 130. Where the user management action is to be performed with respect to multiple usernames or multiple bare metal servers 102, the workflow orchestrator 128 may select multiple workers, e.g., a worker 130 for each username, for each bare metal server 102, or for a batch of usernames and/or bare metal servers 102.

Each selected worker 130 (hereinafter "the selected worker 130") may then retrieve 1106 the identified workflow (e.g., executable code defining the workflow) from the session management workflow repository 506 (if not already present on the worker 130) and execute the workflow.

Executing the workflow may include establishing 1108 a secure command line interface (CLI) interface to the bare metal server 102. For example, secure shell (SSH) protocol may be used to connect to a SSH daemon executing on the bare metal server 102. The SSH daemon is a common utility in most UNIX-based operating systems and therefore a dedicated agent of the orchestrator 104 is not required or used to perform password rotation. The worker 130 may then transmit 1110 instructions to the bare metal server 102 through the CLI interface to implement the session management action. The bare metal server 102 receives the instructions and executed 1112 in order to perform password rotation. For example, step 1110 may include transmitting a file (e.g., script or binary executable) to the bare metal server 102 that, when executed 412, causes the bare metal server 102 to implement the session management action.

The worker 130 may further verify 1114 successful completion of password rotation. Verifying successful completion may include (a) receiving a message transmitted in response to executing instructions included in the file and/or (b) transmitting commands through the CLI interface to read the state of the bare metal server 102 in order to verify that that the session management action has been completed.

In some embodiments, the vault store 114 (see FIG. 1) may also be modified 1116 according to the session management action. For example, where a user is blocked from future logins, the vault 112 may be instructed to modify 1116 the vault store 114 to remove the username and any passwords of the user from the vault store 114.

There are many session management actions that the bare metal server 102 may be instructed to perform at step 1112 and the session management actions may be implemented in various ways. A number of non-limiting examples are listed below:

Limiting access for a username may include causing the bare metal server 102 to remove the username from a group having certain resources (applications, files, directories, services, commands) associated with it. The username may be added to a different group with a reduced number of resources associated with it. Other limitations may include limiting the network domains (e.g., limiting to an enterprise network) through which the username is allowed to access the bare metal server 102.

Blocking a user may include removing entries referencing the username and any passwords associated with the username from files of the bare metal server 102 where usernames and passwords are stored. Blocking may include adding the username to a blacklist stored on the bare metal server 102 such that usernames on the blacklist are not allowed to login to the bare metal server. When a user is blocked, a corresponding password file associated with the bare metal server 102 in the vault store 114 may also be modified to remove the username such that if the password file is restored to the bare metal server 102 from the vault store 114 (or is used as the basis for generating a new password file), logging in using the username will not be re-enabled.

Blocking a user may also include performing a password rotation with respect to the bare metal server as discussed above. The password rotation may be performed at a non-scheduled time and the passwords rotated onto the bare metal server may exclude any passwords associated with the username such that future logins using the username are prevented.

Logging off a user may include instructing the bare metal server 102 to log off the username, terminate any user session processes associated with the username, restart the bare metal server 102, end a network connection to the device by which a user is accessing the bare metal server 102 using the username, or perform any other action to block access using the username.

Blocking future logins may include instructing the bare metal server 102 to prevent future logins, moving a file storing passwords such that future logins are prevented, pausing a daemon that receives login requests, blocking access to an executable used to launch user session processes, or performing any other action that will prevent additional logins. A workflow for blocking logins may additionally include a step of reversing blocking either at a predefined time or in response to detecting that the number of users logged in to a bare metal server 102 or group of bare metal servers is below a predefined threshold at which logins should again be permitted.

Various other modifications to the above-described approach may be made. First, the method 1100 may be invoked in response to various triggers, some of which do not involve the processing of user session records. For example, the discovery of a threat may be made in various ways other than processing user session records. Accordingly, a session management action to block a compromised user name or prevent new logins may be invoked in response to the discovery of such a threat.

Likewise, actions taken in response to processing of user session records may be performed without performing the method 1100. For example, monitoring activities performed by a user logged in under user may be performed remote from the bare metal server 102 using log data pulled from the bare metal server by the vector log agent 500 or other component. Alerts may be transmitted to an administrator in response to suspicious or malicious activity or other anomalies detected in the user session records without invoking the method 1100.

The methods disclosed herein may be integrated with KUBERNETES. Pods, containers, and other entities managed by KUBERNETES may be processed as described above. In particular, log data of such entities may be pulled and user management actions may be performed with respect to such entities, such as using APIs, hooks, or other interfaces provided by KUBERNETES.

Figure 12:
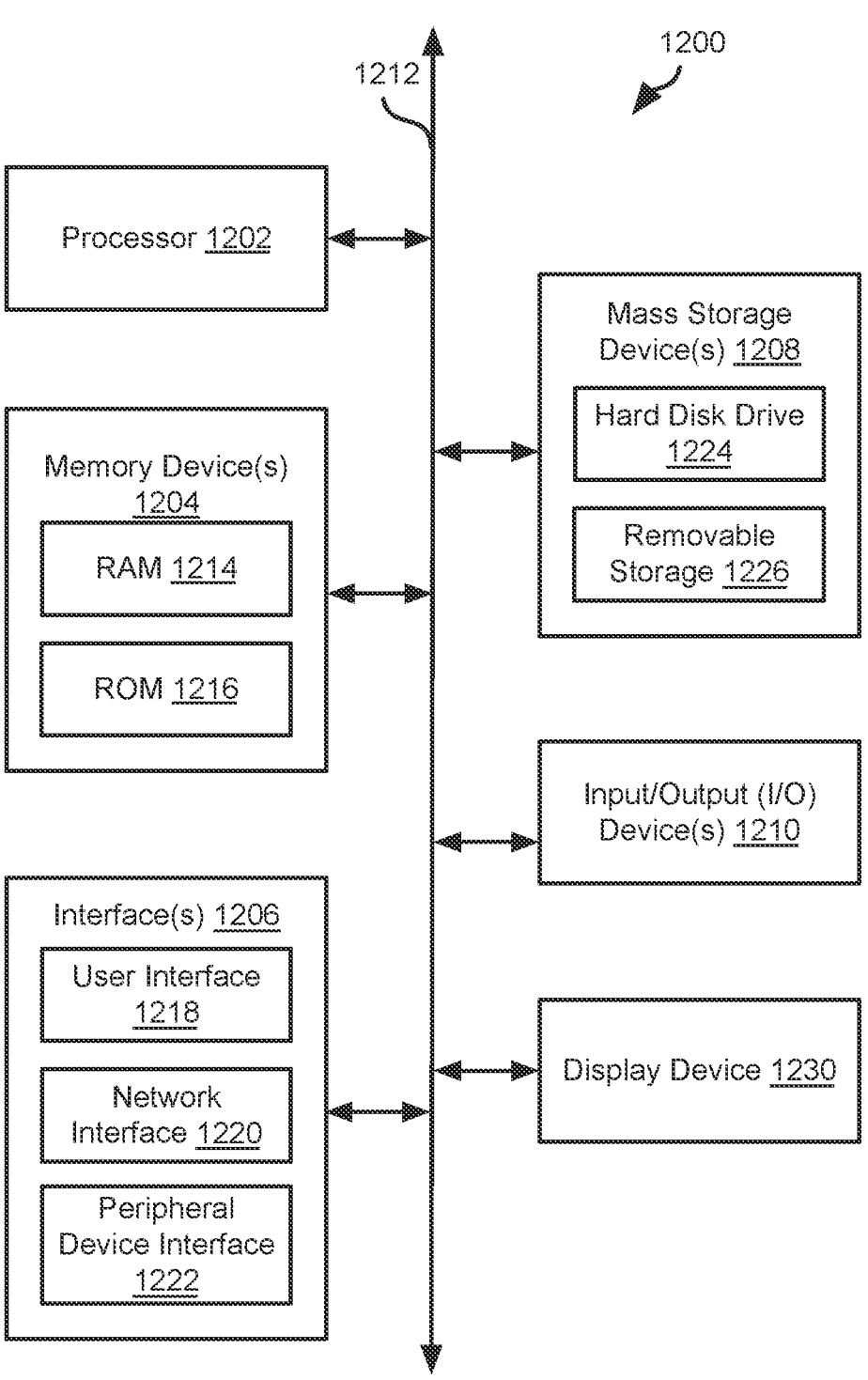
FIG. 12 is a schematic block diagram of an example computing device suitable for implementing methods in accordance with embodiments of the invention.

FIG. 12 is a block diagram illustrating an example computing device 1200. Computing device 1200 may be used to perform various procedures, such as those discussed herein. The bare metal servers 102, orchestrator 104, vault 112, scheduler 116, and workflow orchestrator 128 may be implemented using one or more computing devices 1200. The orchestrator 104, vault 112, scheduler 116, and workflow orchestrator 128, vector agent 500, and session log processor 504 may be implemented on different computing devices 1200 or a single computing device 1200 may host two or more of the orchestrator 104, vault 112, scheduler 116, and workflow orchestrator 128.

Computing device 1200 includes one or more processor(s) 1202, one or more memory device(s) 1204, one or more interface(s) 1206, one or more mass storage device(s) 1208, one or more Input/output (I/O) device(s) 1210, and a display device 1230 all of which are coupled to a bus 1212. Processor(s) 1202 include one or more processors or controllers that execute instructions stored in memory device(s) 1204 and/or mass storage device(s) 1208. Processor(s) 1202 may also include various types of computer-readable media, such as cache memory.

Memory device(s) 1204 include various computer-readable media, such as volatile memory (e.g., random access memory (RAM) 1214) and/or nonvolatile memory (e.g., read-only memory (ROM) 1216). Memory device(s) 1204 may also include rewritable ROM, such as Flash memory.

Mass storage device(s) 1208 include various computer readable media, such as magnetic tapes, magnetic disks, optical disks, solid-state memory (e.g., Flash memory), and so forth. As shown in FIG. 12, a particular mass storage device is a hard disk drive 1224. Various drives may also be included in mass storage device(s) 1208 to enable reading from and/or writing to the various computer readable media. Mass storage device(s) 1208 include removable media 1226 and/or non-removable media.

I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, lenses, CCDs or other image capture devices, and the like.

Display device 1230 includes any type of device capable of displaying information to one or more users of computing device 1200. Examples of display device 1230 include a monitor, display terminal, video projection device, and the like.

Interface(s) 1206 include various interfaces that allow computing device 1200 to interact with other systems, devices, or computing environments. Example interface(s) 1206 include any number of different network interfaces 1220, such as interfaces to local area networks (LANs), wide area networks (WANs), wireless networks, and the Internet. Other interface(s) include user interface 1218 and peripheral device interface 1222. The interface(s) 1206 may also include one or more peripheral interfaces such as interfaces for printers, pointing devices (mice, track pad, etc.), keyboards, and the like.

Bus 1212 allows processor(s) 1202, memory device(s) 1204, interface(s) 1206, mass storage device(s) 1208, I/O device(s) 1210, and display device 1230 to communicate with one another, as well as other devices or components coupled to bus 1212. Bus 1212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1200, and are executed by processor(s) 1202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
selecting, by a first computer system, one or more parameters defining performing password rotation with respect to a remote server connected to the first computer system by a network, the first computer system selecting the one or more parameters according to both of (a) a location of the server in a telecommunication system and (b) a frequency of unsuccessful login attempts detected for the server, the one or more parameters including a frequency of password changes and password requirements;
detecting, by the first computer system, that password rotation is due for the server according to the one or more parameters; and
executing, by the first computer system, a workflow to perform password rotation on the server over the network, the workflow including making application programming interface (API) calls, by the workflow, to an API of an operating system executing on the server to perform the password rotation.

2. The method of claim 1, wherein the one or more parameters include one or more rules for generating passwords for the server.

3. The method of claim 1, wherein the one or more parameters include a cron command.

4. The method of claim 1, wherein the one or more parameters are associated with a theme to which the server is assigned.

5. The method of claim 4, wherein the theme corresponds to the location of the server in the telecommunication network.

6. The method of claim 1, wherein invoking execution of the workflow comprises selecting a worker from a worker pool and instructing the worker to execute the workflow.

7. The method of claim 1, wherein execution of the workflow includes storing passwords in a password vault store.

8. The method of claim 1, wherein execution of the workflow includes establishing a secure command line interface to the server and transmitting instructions through the secure command line interface.

9. The method of claim 8, wherein the secure command line interface includes a secure shell (SSH) connection to the server.

10. The method of claim 1, further comprising modifying the one or more parameters to increase a frequency of performance of password rotation in response to unsuccessful login attempts on the server.

11. A system comprising:
a computing device including one or more processing devices and one or more memory devices operably coupled to the one or more processing devices, the one or more memory devices storing executable code that, when executed by the one or more processing devices, causes the one or more processing devices to:
select one or more parameters defining performing password rotation with respect to a remote bare metal server connected to the computing device by a network, the one or more parameters selected according to both of (a) a location of the bare metal server in a telecommunication system and (b) a frequency of unsuccessful login attempts detected for the bare metal server, the one or more parameters including a frequency of password changes and password requirements;
detect that password rotation is due for the bare metal server according to the one or more parameters; and
executing a workflow to perform password rotation on the bare metal server over the network, the workflow including making application programming interface (API) calls, by the workflow, to an API of an operating system executing on the bare metal server to perform the password rotation.

12. The system of claim 11, wherein the one or more parameters include one or more rules for generating passwords for the bare metal server.

13. The system of claim 11, wherein the one or more parameters include a cron command.

14. The system of claim 11, wherein the one or more parameters are associated with a theme to which the bare metal server is assigned.

15. The system of claim 11, wherein the executable code, when executed by the one or more processing devices, further causes the one or more processing devices to invoke execution of the workflow by selecting a worker from a worker pool and instructing the worker to execute the workflow.

16. The system of claim 15, wherein the executable code, when executed by the one or more processing devices, further causes the one or more processing devices to invoke execution of the workflow by retrieving the workflow from a repository.

17. The system of claim 11, wherein execution of the workflow includes storing passwords from a password vault store.

18. The system of claim 11, further comprising the bare metal server, the bare metal server being an edge server coupled to an antenna of a telecommunication network.

19. A non-transitory computer-readable medium storing executable code that, when executed by one or more processing devices, causes the one or more processing devices to:
select one or more parameters defining performing password rotation with respect to a remote bare metal server connected to a computing device by a network according to both of (a) a location of the bare metal server in a telecommunication system and (b) a frequency of unsuccessful login attempts detected for the bare metal server, the one or more parameters including a frequency of password changes and password requirements;
detect that password rotation is due for the bare metal server according to the one or more parameters; and
invoke execution of a workflow to perform password rotation on the bare metal server over the network, the workflow being executed by the computing device and including making calls, by the workflow, to application programming interface (API) of an operating system executing on the bare metal server.

20. The non-transitory computer-readable medium of claim 19, wherein the one or more parameters include one or more rules for generating passwords for the bare metal server and a cron command.

* * * * *